United States Patent [19]

Bhattacharyya et al.

[11] 4,088,624
[45] May 9, 1978

[54] SELF-HARDENING MOLDING COMPOSITIONS

[75] Inventors: Asita Bhattacharyya, Senlis; Michel Jean-Claude Dormoy, Chantilly; Gerard Yves Richard, Precy sur Oise, all of France

[73] Assignee: Societe d'Applications de Procedes Industriels et Chimiques S.A.P.I.C., Asnieres, France

[21] Appl. No.: 682,214

[22] Filed: May 3, 1976

[30] Foreign Application Priority Data

Dec. 26, 1975 France ............................ 75 39802

[51] Int. Cl.² .......................... C08K 3/16; C08K 5/13; C08K 5/55
[52] U.S. Cl. ........................................ 260/38; 164/43; 260/DIG. 40; 260/39 R; 260/42.53
[58] Field of Search .............. 260/38, DIG. 40, 39 R, 260/42.53; 164/43

[56] References Cited

U.S. PATENT DOCUMENTS

| 3,622,536 | 11/1971 | Ruddle et al. | 260/38 |
| 3,635,877 | 1/1972 | Van Wyk | 260/38 |
| 3,647,744 | 3/1972 | Rich et al. | 260/38 |
| 3,770,465 | 11/1973 | Howells | 260/38 X |

Primary Examiner—Sandra M. Person
Attorney, Agent, or Firm—Keil, Thompson & Shurtleff

[57] ABSTRACT

A composition of self-hardening molding material and the hardening process are provided for making a solid or a hollow body wherein self-hardening molding material comprising at least one inert charge, either in granule and/or in powder form is intimately mixed with at least one organic resin serving as binding agent, and at least with one agent for the hardening of the binder, characterized by the fact that it includes fluoride (F⁻) ions.

18 Claims, No Drawings

SELF-HARDENING MOLDING COMPOSITIONS

The present invention relates to a composition of molding materials which is self-hardening, comprising at least one inert charge, granular and/or pulverulent, intimately mixed with at least one organic resin serving as binding agent, and with at least one agent for the hardening of the binder. The invention also relates to a process for the hardening of a solid or of a hollow body formed with the self-hardening composition of said molding materials.

The fields of application of the present invention are numerous, and it is possible to mention, especially, foundry, the inert charge being sand; the refractory industry, the charge being a refractory product; the building industry, the charge being a marble powder, a gravel or any other building material; the finishing and polishing industry, the charge being an abrasive substance such as corundum, alumina, silica, silicon carbide and emery; the automobile industry and more specifically that of brake linings, the charge being a friction agent such as asbestos, copper powder; those aforementioned fields of application, moreover not being limitative.

It is known that the fabrication of a solid or of a hollow body, in the foundry field, for example, the formation of a mold or of a core from a composition of molding materials includes two operations. In a first step, the granular and/or pulverulent inert charge is intimately mixed with one or several organic resins acting as binding agents which give the charge a certain degree of plasticity, as well as with one or several hardening agents which ensure the setting of the binder. In a second step, the composition of molding materials comprising the three aforementioned components, is hardened, most of the time at room temperature and at times following a slight rise in temperature.

Among the organic resins most commonly used, there may be mentioned the phenol resins, either pure or modified, the formaldehyde-acetone resins, as well as any of various copolymers. Most of those resins harden with an acid reaction; a few among the phenol-formaldehyde resins, especially those of the Novolac type, harden with an alkaline reaction, as do the formaldehyde-acetone resins.

It is a well-known fact that, in the particular case of those resins hardening with an acid reaction, the hardening of the molding material composition is more rapid with stronger acids and/or with a larger proportion of acids introduced. Moreover, it is evident that in practice a hardening process as rapid as possible is desired by users, especially for the purpose of reducing costs.

Unfortunately, a limit exists which is inherent in the hardening process, a limit resulting from the fact that the stronger the acid, or the more acid there is introduced, the weaker the mechanical characteristics of the body or object obtained after hardening, resulting from a destruction of the properties of the resin, and more especially from a partial carbonization of the resin by the acid.

It is possible, moreover, to classify the organic resins hardening with an acid reaction into three classes, as a function of the tolerance such resins show for the strong mineral acids.

CLASS A.
- The urea-formaldehyde resins modified with furfuryl alcohol, which tolerate significant quantities of either sulfuric or hydrochloric acid, ranging up to 40 percent or 50 percent, on the basis of the weight of the binding agent, and even up to 70 percent when the composition remains at low temperature.

CLASS B.
- Resins of the furfuryl alcohol prepolymer type, copolymers of phenol-formaldehyde, formaldehyde-urea, furfuryl alcohol and the phenol-formaldehyde type modified with furfuryl alcohol, such resins having a much lower tolerance to strong mineral acids than those defined under CLASS A., their tolerance not exceeding 10 percent to 15 percent. The last class of resins, moreover, is less tolerant than are the first two classes.

CLASS C.
- Phenolic resins, either pure or modified with formaldehyde-urea, the tolerance of which does not exceed 2 percent to 5 percent of strong mineral acids.

It is evident that the more powerful hardening agents, i.e., the most rapid ones, cannot be used in the hardening process of resins from CLASSES B. and C., which resins only present reduced possibilities since they have neither the flexibility nor the universality of use reached by the resins in CLASS A.

The present invention has as its purpose to remedy the above-mentioned drawbacks, and to that end, it has as its object a self-hardening composition of molding materials which makes it possible to use, in all cases and with whatever resin present, a powerful hardening agent, that is to say a very rapid one, capable of high performance at the time of hardening. Such a composition makes possible, especially even with the phenolic resins which are sensitive to acid, as already stated, the use of hardening agents having a high sulfuric or hydrochloric acid content up to 50 percent or 70 percent by weight, i.e., a performance level identical with that of the resins in Class A.

The improvement is a selective one, since it relates only to those resins hardening with an acid reaction, and which have a low level of tolerance with respect to strong mineral acids such as sulfuric or hydrochloric acid, which acids formerly were harmful to the final mechanical characteristics of the formed bodies or objects. As a result of the selective improvement, the polymerization durations at the time of hardening of the formerly less tolerant resins are appreciably shortened, whence it follows that a considerable advantage is obtained by an appreciable reduction in the costs of bodies so produced. At the same time, it has been found that the final mechanical characteristics are maintained at an optimum level, the partial carbonization of the resin being overcome.

The present invention is further characterized in that it provides a general improvement for all of the resins used as binding agents, that is to say, of those resins hardening with an alkaline reaction as well as for those hardening with an acid reaction, and in the latter case regardless of whether they are tolerant with respect to strong mineral acids. It has indeed been found that the mechanical characteristics of all of the bodies constructed are improved when they are hardened in the presence of the catalyst which ensures a first selective improvement with respect to resins having a low level of tolerance for strong mineral acids. The catalytic action therefore works in two different stages in practice, ensuring at each stage an improvement of the final mechanical characteristics. The improvement is singular in the case of resins hardening with an alkaline reaction, as well as in the case of resins hardening with an acid reaction but which tolerate strong mineral acids. The improvement is cumulative in the case of those resins hardening with an acid reaction but having a low level of tolerance for strong mineral acids.

The present invention therefore has as an object a self-hardening composition of molding materials comprising at least one inert charge which is either granular and/or pulverulent and which is intimately mixed with at least one organic resin serving as a binding agent, and at least one agent for the hardening of the binder, characterized by the fact that it includes fluoride ($F^-$) ions.

It has been found that the mechanical properties, and especially resistance to traction and resistance to flexing of either solid or hollow bodies or objects obtained after hardening of the aforementioned composition were very significantly improved by the presence of fluoride ($F^-$) ions, regardless of the charge and of the type of hardening reaction of the resin, whether acid or alkaline. The improvement of the mechanical properties thus is of a general order, since it relates to the urea-formaldehyde, phenol-formaldehyde (resorcinol or Novalac type), furane (pure or modified) formaldehyde-acetone resins, and any copolymer in these various classes.

It has been found, moreover, that the addition of fluoride ($F^-$) ions to the composition, even at a low percentage level, that is to say, less than 10 percent by weight on the basis of the binder, makes possible the use of the very powerful hardening agents with all of the resins. The fluoride ($F^-$) ions act here as true catalysts, making the resins that are more sensitive to the strong mineral acids such as the phenol resins perfectly tolerant with respect to sulfuric or to hydrochloric acid, since the mechanical characteristics, in the final stage, are not lowered. It has been especially found that the presence of fluoride ($F^-$) ions improves the tolerance to strong mineral acid of all resins hardening with an acid reaction, said improvement being the more marked as the resin is less tolerant, which is the case, for example, for the phenolic resins.

In a preferred method of operation, the fluoride ($F^-$) ions contained in the composition are introduced in the form of at least one acid, and/or at least one salt, and/or at least one complex compound. All forms of introducing the fluoride ($F^-$) ions, therefore, are acceptable.

The inert charge of the composition can be a sand, especially a sand meant for foundry use, a refractory product, an abrasive product, a friction agent, a marble powder, a gravel or any other building material. The fields of application of the invention are consequently numerous since all of the inert charges agglomerated with a resin and with a hardening agent to form by self-hardening a solid or hollow object have their mechanical characteristics improved in a selective or in a cumulative manner.

The hardening agent of the binder can be either acid or alkaline. All of the organic resins capable of agglomerating inert charges in self-hardening compositions, therefore, are perfectly compatible with the present invention. The composition preferably comprises between 0.01 percent and 5 percent of fluoride ($F^-$) ions on the basis of the weight of the binding agent. These low proportions demonstrate the catalytic character of the fluoride ($F^-$) ions.

The composition comprises between 3 percent and 70 percent by weight of a strong mineral acid, either alone or in a mixture, on the basis of the weight of the binder; especially, the presence of fluoride ($F^-$) ions in the composition makes possible the use of hardening agents having a high sulfuric or hydrochloric acid content with those resins which are most sensitive, even with the phenolic resins, a situation which gives to the latter performances identical henceforth with those of the tolerant resins, more flexible and general in use, as represented by the urea-formaldehyde resins modified with furfuryl alcohol.

The present invention also has as its object a process for the hardening of a solid or of a hollow body made from a self-hardening composition of molding material, comprising at least one inert charge, either granular and/or pulverulent, intimately mixed with at least one organic resin serving as a binding agent, and with at least one hardening agent for the binder, characterized by the fact that there are introduced into the composition fluoride ($F^-$) ions as catalyst of the hardening process.

In a preferred method of operation, the fluoride ($F^-$) ions are introduced into the composition with at least one of the three components of said composition. All methods of introduction of the fluoride ($F^-$) ions, therefore, are perfectly compatible with the present invention.

In a first embodiment, the fluoride ($F^-$) ions are introduced into the hardening agent as acids such as hydrofluoric acid (HF), fluosilicic acid ($H_2SiF_6$), or fluoboric acid ($HBF_4$), or in the form of boron trifluoride-phosphoric or acetic acid complexes, or in the form of a boron trifluoride-phenol complex. This embodiment is the simplest method of introduction.

In a second embodiment, the fluoride ($F^-$) ions are introduced into the resin either in the form of at least one of the HF, $H_2SiF_6$, $HBF_4$ acids, for example, or in the form of salts of said hydrofluoric, fluosilicic or fluoboric acids, or in the form of complexes of boron trifluoride. It is thus possible to utilize the neutral and acid fluorides of sodium, potassium, chromium, and/or ammonium, e.g., the fluorides of sodium, barium, antimony, lithium, tin, manganese, zinc, calcium; the fluoborates of sodium, ammonium, potassium, cadmium, copper, tin, iron, nickel, lead, zinc; the fluosilicates of ammonium, barium, magnesium, lead, potassium, or zinc; and the complexes of boron trifluoride with amines.

This method of operation is especially suitable for the phenolic resins of the resorcinol type, and for the acetone-formaldehyde resins. However, even though it is preferentially well suited for resins hardening with an alkaline reaction, it is also suited for all the other types of resins. There is therefore found again here the general advantage of application to all the types of resins.

In a third embodiment, the fluoride ($F^-$) ions are introduced into the inert charge, preferably in the form of finely ground fluorinated minerals such as cryolite ($Na_3AlF_6$), or fluorspar ($CaF_2$).

In a fourth embodiment, the fluoride ($F^-$) ions are introduced into the composition with two at least of the three constituents of said composition.

From a reaction point of view, the hardening process according to the present invention is characterized by the fact that fluoride ($F^-$) ions are introduced into the composition. Thereafter the composition is hardened, either at room temperature or following a small input of heat, by means of hydrofluoric acid produced in situ, said hydrofluoric acid playing the part of catalyst in improving the tolerance of the organic resin for the hardening agent, and especially for strong mineral acids.

When the fluoride ($F^-$) ions are introduced with the hardening agent or with the resin, the hydrofluoric acid is released through the acidity of the strong hardening agent used to cause the resins, and more especially the furane and phenolic resins, to reach the tridimensional (cross-linking) stage.

In the case when the fluoride ($F^-$) ions are introduced into the composition with the granular charge, the attack is slower, and the release of hydrofluoric acid is accelerated through the input of some heat. For this reason the addition of cryolite or of fluorspar presents a more particular interest in the case of the hot recovered sand or in the "hot box" process.

In conclusion, the action of the fluoride ($F^-$) ions, leading in all cases to a finished, hardened product the mechanical properties of which have been improved, and leading in some cases to an acceleration of the hardening process of said finished product, is entirely surprising when it is also considered that strong mineral acids are avoided in any composition, except of course from those in which the resin is tolerant with respect to strong mineral acids, i.e., the uea-formaldehyde resins modified with fulfuryl alcohol. The surprising aspect is more particularly attributable to the fact that the hydrofluoric acid which is released in the very midst of the composition, prior to the hardening of the latter, is an extremely violent mineral acid which consequently is supposed to be avoided in any self-hardening composition.

Not only does the hydrofluoric acid have no adverse action on the resins used, in the sense that it does not carbonize them and does not destroy their final mechanical characteristics, but, on the contrary, it acts favorably on all the types of resins used, making it possible for them--even though the fluoride ($F^-$) ions of the hydrofluoric acid are added in very small quantity--to "accept" considerable proportions of strong mineral acids of the sulfuric or hydrochloric type, which then very simply cause the composition to self-harden very rapidly without any decrease in its mechanical characteristics. The especially surprising, even unexpected, aspect of the result of the action of the fluoride ($F^-$) ions is evidence that the present invention is absolutely unobvious to those skilled in the art.

The invention is further illustrated but not limited by the following Examples which show its possibilities and advantages and in which the quantities are by weight unless otherwise indicated.

In Examples 1 to 9, the values of resistance to flection have been calculated according to the German D.I.N. standard.

In Examples 1 to 8, the inert charge used is super-siliceous sand the index of which is AFS 55-60 according to the United States standard. In Example 9, the inert charge is a recovered super-siliceous sand.

Finally, all of the experiments were carried out with sulfuric acid as the hardening agent. It is obvious, however, that they have their equivalent with hydrochloric acid, this latter acid not having been used since it is a well-known fact that its use is difficult because of the release of harmful chlorine vapors which require a special type of ventilation.

EXAMPLE 1.

A self-hardening composition which comprises a super-siliceous sand mixed with resin of average sensitivity hardened by means of paratoluene sulfonic acid.

Flection test pieces were made at 20° C from super siliceous sand mixed with 0.3 percent of 65 percent paratoluene sulfonic acid containing less than 2 percent of free sulfuric acid, then with 1 percent of resins called "resin A" or "resin B" which are phenol-formaldehyde resins modified with furfuryl alcohol, or with 1 percent of a "resin C" which is a urea-formaldehyde-phenol formaldehyde-furfuryl alcohol resin containing 1 percent nitrogen. Resins A and B chemically had the same components, and resin A was richer in furfuryl alcohol than resin B.

Test pieces were made:
a. with the hardening agent as such,
b. with the same hardening agent, after having added by weight, on the basis of the hardening agent, 1 percent of 40 percent hydrofluoric acid, i.e., 0.4 percent active hydrofluoric acid.

The values of the resistance to flection, RF in $Kg/cm^2$ obtained five hours and 24 hours following additions of the paratoluene sulfonic hardening agent (PTS), with and without hydrofluoric acid (HF), are set forth in the following table:

|  | PTS without HF | | PTS with HF | |
| --- | --- | --- | --- | --- |
|  | RF 5 hours | RF 24 hours | RF 5 hours | RF 24 hours |
| Resin A | 50 | 61 | 59 | 70 |
| Resin B | 38 | 47 | 57 | 63 |
| Resin C | 41 | 50 | 58 | 70 |

It will be noted, in the first place, the improvement in the resistances to flection in the case in which the hardening agent contains hydrofluoric acid is relatively small, because the hardening agent contains very little free sulfuric acid. Secondly, the variations between the values obtained with and without HF are much sharper in the case of resin B than in the case of resin A. If there is added to that observation the fact that resin B is less rich in furfuryl alcohol than resin A, and that consequently its sensitivity to strong mineral acid hardening agents is much more marked, it is observed the already stated phenomenon, viz., the fluoride ($F^-$) ions added to a composition decrease the sensitivity of the resin to the hardening agent, and they decrease it the more markedly as the resin is less tolerant with respect to the same hardening agents.

EXAMPLE 2.

A self-hardening composition comprising a sand mixed with a resin the sensitivity of which is average, which can polymerize with its usual hardening agents.

Sample pieces for flection tests were made at 20° C from super-siliceous sand mixed with 0.3 percent of various hardening agents, viz., sulphonic acid, sulfuric and phosphoric acid, then with 1 percent of a urea-formaldehyde — phenol-formaldehyde — furfuryl alcohol resin, called "resin C", identical with the one in Example 1.

The three hardening agents tested are indicated by the code indications: D1, D2 and D3. They respectively contain: less than 0.8 percent, 3.75 percent and 10 percent of sulfuric acid, and, respectively: 50 percent, 25 percent and 50 percent of phosphoric acid.

Test samples were made:
a. with the hardeners by themselves,
b. with those same hardening agents after there has been added to them 1 percent of 50.5 percent HBF$_4$, that is to say, 0.5 percent active.

The values of the resistances to flection RF in Kg/cm$^2$ obtained five hours and 24 hours following addition of the hardeners, with and without HBF$_4$ are set forth in the following table:

|     | Without HBF$_4$ | | With HBF$_4$ | |
| --- | --- | --- | --- | --- |
|     | RF 5 hours | RF 24 hrs. | RF 5 hrs. | RF 24 hrs. |
| D 1 | 25 | 30 | 41 | 50 |
| D 2 | 23 | 28 | 46 | 58 |
| D 3 | 18 | 23 | 34 | 48 |

The improvement of the RF values when HBF$_4$ is added to the hardening agents is, this time, much more marked, because the proportion of strong mineral acids is more substantial than in Example 1.

It is found, moreover, that the best results are obtained with hardening agent D 2, that is to say, with the hardening agent containing the smallest quantity of phosphoric acid which by far proves the less significant in the mixture formed with sulfonic, sulfuric and phosphoric acids.

EXAMPLE 3.

Self-hardening composition comprising a sand mixed with a resin having little sensitivity, of the urea-formaldehyde type, modified with furfuryl alcohol, and the hardening agents usually used with that resin.

Test pieces for flection tests were made at 20° C from super-siliceous sand mixed with 0.3 percent of hardening agents formed by various acid compositions like sulfonic acid, sulfuric acid and phosphoric acids, then with 1 percent of a urea-formol resin modified with furfuryl alcohol, called "Resin D".

The two hardening agents tested are indicated by their code names: D 4 and D 5; they respectively contain 17.3 percent and 28.9 percent of sulfuric acid.

Test pieces were made:
a. with the hardening agents by themselves,
b. with the same hardening agents to which there was added by weight 1 percent of 40 percent HF, i.e., 0.4 percent active.

The values for the resistances to flection RF in Kg/cm$^2$ obtained 5 hours and 24 hours after addition of the hardeners, with and without HF, are set forth in the following table:

|     | Without HF | | With HF | |
| --- | --- | --- | --- | --- |
|     | RF 5 hours | RF 24 hours | RF 5 hours | RF 24 hours |
| D 4 | 39 | 45 | 50 | 57 |
| D 5 | 34 | 35 | 56 | 61 |

From these results it will be seen:
(a) In the first place, the RF values are better when hydrofluoric acid is added to the hardening agents.
(b) In second place, in the absence of hydrofluoric acid, the values obtained with D 4 are better than those obtained with D 5; the cumulative effect here is clearly marked, said effect being the more important as the percentage of strong acid is increased, since in the present case the sulfuric acid contained in D 5 is approximately double that contained in D 4. Regarding the results obtained without HF, it is further possible to add that it is logical for D 5, which contains more H$_2$SO$_4$ than D 4, will give lower RF values, this resulting from the fact that the too high proportion of H$_2$SO$_4$ in D 5 has "carbonized" resin D.

EXAMPLE 4.

Self-hardening composition comprising a sand mixed with a resin sensitive to strong mineral acids, and with hardening agents rich in sulfuric acid.

Test pieces for flection tests were made at 20° C from super-siliceous sand mixed with 0.3 percent of hardening agents composed of various compositions of sulfonic acids, sulfuric acid and phosphoric acids, then with 1 percent of a phenolformaldehyde resin modified with furfuryl alcohol ("Resin E"). The two hardening agents tested are indicated by code names D 3 and D 6. They respectively contain 10 and 20 percent of sulfuric acid, but are of comparable strengths (identical time of use and identical hardening).

Test pieces were made:
a. with the hardening agents by themselves,
b. after the addition to those hardening agents, by weight, of 1 percent of 50 percent HBF$_4$, i.e., 0.5 percent active.

The values for the resistance to flection RF in Kg/cm$^2$ obtained 5 hours and 24 hours after addition of the hardening agents, with and without HBF$_4$, are set forth in the following table:

|     | Without HBF$_4$ | | With HBF$_4$ | |
| --- | --- | --- | --- | --- |
|     | RF 5 hours | RF 24 hours | RF 5 hours | RF 24 hours |
| D 3 | 14 | 23 | 25 | 48 |
| D 6 | 9 | 15 | 39 | 57 |

In addition to the fact that the RF values are appreciably increased when the fluoride (F$^-$) ions are added to the hardening agents in the form of fluoboric acid, it has been found that the variation between the values obtained with and without HBF$_4$ are more important for hardening agent D 6, that is to say, the improvement is the more marked as the sulfuric acid content of the hardening agent is higher.

EXAMPLE 5.

Self-hardening compositions containing a sand mixed with a highly sensitive resin, of the phenol type, and with paratoluene sulfonic acid.

Test pieces for flection tests were made at 20° C, from super-siliceous sand mixed with 0.6 percent of 65 percent paratoluene sulfonic acid (PTS), then with 1.2 percent of phenol resins of the 'resol' type, called "Resin F", and "Resin G".

Test pieces were made:
a. With the hardening agent by itself,
b. After addition to said hardening agent, by weight, of 0.5 percent of 50 percent HBF$_4$, that is to say 0.25 percent active.
c. After addition to said hardening agent, by weight, of 1 percent of 50 percent HBF$_4$, that is to say 0.5 percent active.

The values of the resistances to flection RF in $Kg/cm^2$ 5 hours and 24 hours following addition of the hardening agent, are set forth in the following table:

|  | PTS without $HBF_4$ | | PTS + 0.5 % $HBF_4$ | | PTS + 1 % $HBF_4$ | |
| --- | --- | --- | --- | --- | --- | --- |
|  | RF 5 hrs. | RF 24 hrs. | RF 5 hrs. | RF 24 hrs. | RF 5 hrs. | RF 24 hours |
| Resin F | 39 | 41 | 54 | 65 | 57 | 65 |
| Resin G | 33 | 38 | 49 | 62 | 51 | 60 |

It can be seen that the RF values markedly increase when fluoboric acid is added to the hardening agent, and that starting from a given quantity of fluoride ($F^-$) ions added, the RF values no longer are practically modified. This therefore is a confirmation that the fluoride ion vehicle can be added in small quantity, the hardening process not leading to better results after 0.25 percent to 0.5 percent of $HBF_4$ have been exceeded.

EXAMPLE 6.

Self-hardening compositions comprising a sand mixed with a highly sensitive resin of the phenol type, and with hardening agents very rich in sulfuric acid.

Test pieces for flection tests were made at 7° C from super-siliceous sand mixed with 0.5 percent of a so-called D 7 hardening agent containing 36 percent of sulfuric acid, then with 1 percent of a phenol resin, of the resol type, called "Resin H".

Test pieces were made:
a. With the hardening agent by itself,
b. After addition to said hardening agent, by weight, of 1 percent of 40 percent HF, that is to say 0.4 percent active.

The values of the resistances to flection RF in $Kg/cm^2$, obtained 5 hours and 24 hours after addition of the hardening agent, with and without HF, are set forth in the following table:

| Without HF | | With HF | |
| --- | --- | --- | --- |
| RF 5 Hrs. | RF 24 Hrs. | RF 5 Hrs. | RF 24 Hrs. |
| 5 | 10 | 17 | 37 |

The improvement of the resin's tolerance for the strong hardening agent, sulfuric acid, is in this case most obvious. Said improvement, resulting from the presence of the fluoride ($F^-$) ions contained in HF, is especially imposing in this case since the binding agent used is a phenol resin known to be very little tolerant of sulfuric acid when the fluoride ion catalysts are not present.

EXAMPLE 7.

Self-hardening compositions comprising a super-siliceous sand mixed with a highly sensitive resin, of the phenol type, into which the $F^-$ ions are introduced in the course of fabrication.

A phenol resin of the "resol" type, called "Resin G" is condensed:
a. either without addition of $F^-$ ions,
b. or in the presence of 1 percent of NaF
c. or with addition of 1 percent of 50 percent $HBF_4$ After making flection test pieces under the same conditions as before, with 0.6% of 65 percent paratoluene sulfonic acid (without any $F^-$ ions), there are obtained the following resistance to flection RF values, in $Kg/cm^2$:

|  | RF 5 Hours | RF 24 Hours |
| --- | --- | --- |
| Resin G without NaF | 29 | 36 |
| Resin G with NaF | 45 | 58 |
| Resin G with $HBF_4$ | 54 | 67 |

It can be seen that the values of the resistances to flection are appreciably increased when the fluoride ions are present in the phenol resin. The increase of the RF values is of the order of 60 percent when the fluoride ion is present, the fluoboric acid supplying results slightly superior to those obtained with the sodium fluoride.

EXAMPLE 8.

Self-hardening compositions comprising a super-siliceous sand mixed with a phenol resin, of the Novolac type, using an alkaline hardening agent, and into which the fluoride ($F^-$) ions are introduced in the course of fabrication.

A phenol resin, of the Novolac type, called "Resin I" is condensed:
a. either without addition of $F^-$ ions
b. or with addition of $NaBF_4$.

After test samples have been made to measure the traction in $Kg/cm^2$, with 0.30 percent of hardening agent (hexamethylenetra amine) and 3 percent of Resin I, there are obtained, after polymerization on a hot plate, the following resistance to traction values RT, in $Kg/cm^2$, after 30 seconds and 60 seconds, respectively:

|  | RT 30" | RT 60" |
| --- | --- | --- |
| Resin I without $NaBF_4$ | 35 | 38 |
| Resin I with $NaBF_4$ | 46 | 50 |

It is apparent once more that the introduction of fluoride ions into one of the components of the composition, the resin in the present case, enhances the characteristics, in this case those of resistance to traction. It will be further recalled that the resin under consideration is a resin reaction with an alkaline hardening agent, which truly proves that the fluoride ion environment exerts a favorable action on all types of resin (the favorable action of an improvement in the mechanical characteristics) and that it does not merely selectively render tolerant to strong acids those resins which are not so tolerant.

EXAMPLE 9.

Self-hardening compositions comprising a super-siliceous recovery sand in which fluoride ions introduced directly into that charge.

Test pieces for flection tests were made from sand coming from sand recovery, and maintained, through control of cooling, at 40° C.

The sand was first divided into two fractions:
a. One fraction which undergoes no treatment
b. One fraction which is mixed with 1 percent of cryolite, the fineness of which is less than 200 mesh (standard sieve).

Each one of those fractions was mixed with 0.3 percent of D 5 hardening agent and with 1 percent of "Resin D". After 2 hours, the values of the resistances to flection, RF, were 30 Kg/cm² for the non-treated sand, and 45 Kg/cm² for the sand mixed with cryolite. The addition of the fluoride ions, directly to the granular charge, therefore, causes exactly the same results as those previously obtained, i.e., the introduction of fluoride (F⁻) ions into one at least of the three components (hardening agent and/or binding resin and/or charge) of the composition has as its result to improve the final mechanical characteristics of the hardened product. It is evident that the present invention is not limited to the methods of application, nor the methods of operation, which have been mentioned, and various modifications are possible without departing from the scope of the present invention.

We claim:

1. A self-hardening composition of molded materials comprising at least one inert charge, either granular or pulverulent, intimately mixed with at least one organic resin as a binding agent, and with at least one acid or alkaline agent for the hardening of the binder, said composition containing between about 0.01 to 5% by weight, with reference to said binding agent, of fluoride ions, said amount being sufficient to catalyze the hardening of said resin.

2. A composition as claimed in claim 1, wherein the fluoride ions which it contains are introduced in the form of at least one compound from the group consisting of acids, salts, complex compounds, and mixtures thereof.

3. A composition as claimed in claim 1, wherein the inert charge is a sand, a refractory product, an abrasive product, a friction agent, a marble powder, or a gravel.

4. A composition as claimed in claim 1, wherein the organic resin serving as binding agent is a phenolic resin either pure or modified with formaldehyde-urea, a formaldehyde-urea resin, a furane resin either pure or modified, a formaldehyde-acetone resin or any copolymer of the aforesaid components.

5. A composition as claimed in claim 1, wherein the hardening agent for the binder is acidic.

6. A composition as claimed in claim 1, wherein the hardening agent for the binder is alkaline.

7. A composition as claimed in claim 1, which includes a resin of a type which has little or an average tolerance for strong mineral acids, and from 3 to 70 percent, on the basis of the weight of the resin, of a strong mineral acid, either alone or in mixture.

8. In a process for the hardening of a solid or hollow body formed from a self-hardening molding material composition containing at least one inert charge, either granular and/or pulverulent, intimately mixed with at least one organic resin which is hardened by an acid or alkaline agent and which serves as a binding agent, and with at least one acid or alkaline hardening agent for the binder, the improvement which comprises introducing into the composition between about 0.01 and 5% by weight, with reference to said binding agent, of fluoride ions to catalyze the hardening process.

9. A process as claimed in claim 8, wherein said fluoride ions are introduced into the composition with at least one of the three components of said composition.

10. A process as claimed in claim 8, wherein said fluoride ions are introduced into the composition in the hardening agent, either in the acid or in a complex state.

11. A process as claimed in claim 8, wherein said fluoride ions are introduced into the composition in the resin in the form of a salt, a complex, or an acid.

12. A process as claimed in claim 8, wherein the fluoride ions are introduced into the composition in the inert charge in the form of ground mineral salts.

13. A process as claimed in claim 8, in which the hardening agent for the binder is at least one strong mineral acid, in the proportion of 3 to 70 percent on the basis of the weight of the organic resin serving as binder.

14. A process for the hardening of a solid or of a hollow body as claimed in claim 8 wherein fluoride ions are introduced into the composition, and thereafter the composition is hardened at room temperature or moderate temperatues, said fluoride ions being derived from hydrofluoric acid formed in situ, said hydrofluoric acid acting as a catalyst in improving the tolerance of the resin for the hardening agent, and especially for the strong mineral acids.

15. A composition as claimed in claim 1, wherein the organic resin is a phenol-formaldehyde resin modified with furfuryl alcohol.

16. A composition as claimed in claim 1, wherein the organic resin is a urea-formaldehyde/phenol-formaldehyde/furfuryl alcohol resin.

17. A composition as claimed in claim 1, wherein the organic resin is a urea-formaldehyde resin modified with furfuryl alcohol.

18. A composition as claimed in claim 1, wherein the organic resin is a phenol-formaldehyde resin of the resorcinol or novolac type.

* * * * *

REEXAMINATION CERTIFICATE (322nd)

United States Patent [19]
Bhattacharyya et al.

[11] B1 4,088,624

[45] Certificate Issued Mar. 26, 1985

[54] SELF-HARDENING MOLDING COMPOSITIONS

[75] Inventors: Asita Bhattacharyya, Senlis; Michel Jean-Claude Dormoy, Chantilly; Gerard Y. Richard, Percy sur Oise, all of France

[73] Assignee: Societe d'Applications de Procedes Industriels et Chimiques S.A.P.I.C., Asnieres, France

Reexamination Request:
No. 90/000,514, Mar. 5, 1984

Reexamination Certificate for:
Patent No.: 4,088,624
Issued: May 9, 1978
Appl. No.: 682,214
Filed: May 3, 1976

[30] Foreign Application Priority Data

Dec. 26, 1975 [FR] France ............................ 75 39802

[51] Int. Cl.$^3$ .................. C08K 3/16; C08K 5/13; C08K 5/55
[52] U.S. Cl. .................. 524/425; 164/521; 164/527; 523/139; 523/152; 524/593; 524/594
[58] Field of Search .................. 260/38, 39 R, 42.53, 260/DIG. 40; 164/43, 521, 527; 523/139, 152; 524/425, 593, 594

[56] References Cited

U.S. PATENT DOCUMENTS

3,644,274  2/1972  Maurukas ...................... 523/144
4,028,271  6/1977  Schaidle et al. ................ 252/429 R

*Primary Examiner*—Theodore Pertilla

[57] ABSTRACT

A composition of self-hardening molding material and the hardening process are provided for making a solid or a hollow body wherein self-hardening molding material comprising at least one inert charge, either in granule and/or in powder form is intimately mixed with at least one organic resin serving as binding agent, and at least with one agent for the hardening of the binder, characterized by the fact that it includes fluoride ($F^-$) ions.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–18 are cancelled.

* * * * *